United States Patent [19]

Ramge et al.

[11] Patent Number: 4,511,328
[45] Date of Patent: Apr. 16, 1985

[54] APPARATUS FOR THE RECLAMATION OF GLASS FIBER FROM SCRAP FIBER GLASS MAT

[75] Inventors: Dennis L. Ramge, Perrysburg, Ohio; John H. Miller, Littleton, Colo.

[73] Assignee: Manville Service Corporation, Denver, Colo.

[21] Appl. No.: 534,218

[22] Filed: Sep. 20, 1983

[51] Int. Cl.$^3$ .......................... F27B 9/28; F27B 17/00
[52] U.S. Cl. ......................................... 432/59; 432/72; 432/186
[58] Field of Search ................ 432/8, 59, 72, 186; 134/2, 15

[56] References Cited

U.S. PATENT DOCUMENTS 3,984,198 10/1976 Birke et al. .............................. 432/59
4,448,578 5/1984 Brunet et al. ........................... 432/72

Primary Examiner—John J. Camby
Attorney, Agent, or Firm—John D. Lister; Richard K. Thomson

[57] ABSTRACT

A method and apparatus for the reclamation of inorganic fibers from waste continuous strips of inorganic fibers. A binding agent, such as an organic binder, must be removed before the fibers can be reused or further processed. One or more layers of continuous strips are conveyed to a heating zone where the strips 42 are supported along a predetermined path as a heating fluid is drawn rapidly through the strips. The heating fluid is controlled as to temperature, pressure and mass flow rate to insure that the binder is properly decomposed and that the products of decomposition are rapidly carried away from the strips to prevent heat buildup which could cause a temperature increase to the fusion point of the fibers. Process temperatures are thus suitably controlled to below the fusion temperature of the fiber material. The reclaimable fiber may be directly recycled, further processed as desired or, in the case where binder is still present on the fibers in unacceptable levels, these nonreclaimable fibers may be dumped for subsequent disposal. Products of binder decomposition are incinerated and form part of the heating fluid drawn through the strips.

6 Claims, 3 Drawing Figures

APPARATUS FOR THE RECLAMATION OF GLASS FIBER FROM SCRAP FIBER GLASS MAT

TECHNICAL FIELD

The present invention relates to a process of removing organic treating material from the surface of inorganic fibers forming a non-woven sheet material. In particular, the instant invention relates to a method and apparatus for removing organic binder from the surface of randomly oriented glass fibers forming a non-woven fiber glass mat.

BACKGROUND AND SUMMARY OF THE INVENTION

Typical glass fiber mat manufacturing operations produce substantial amounts of waste mat. This waste takes the form of edge trim or mat which, for one reason or another, does not meet product specifications. Typically, this waste mat may have a binder content (under or over) which is outside the specifications. Currently, such mat is simply disposed of as waste material. Recovery of the fibers in this waste mat would enable a significant percentage of the cost of its manufacture to be salvaged and eliminate the cost and problems associated with waste mat disposal.

A number of different techniques for recapturing these fibers are possible. One such technique would be to simply chop the binder-containing mat into small nodules and add these nodules to virgin glass fibers to produce a mat. This technique has a number of disadvantages. First, the average fiber length in the recaptured fiber groups will be approximately half that of the virgin fibers as a result of the chopping. Second, these fiber groups will tend to maintain their identity as bundles apart from the remaining virgin fibers, a condition totally unacceptable for most re-use applications.

A second recapture technique is to feed the recaptured fibers directly into the melting furnace with virgin glass batch. The difficulty with this approach is that a major amount of the cost of the fiber is not in the material but, in the cost of production and, by melting the fibers, that amount is lost. In addition, the cost of processing the fibers for feeding to a batch furnace is equal to or greater than the cost of the batch it replaces, making this process economically unattractive.

A third approach is to remove the binder from the fibers and to recycle these recaptured fibers. One such removal technique employs one or more chemicals to chemically reduce the binder for removal. One potential problem with such a method is that the chemical must then, itself, be removed or washed from the fibers with there being some potential for fiber damage, either from the chemical or from the washing process.

An alternate binder removal approach involves heating the binder-containing glass in order to burn out the binder. Care must be taken in this burnout process not to raise the temperature of the fibers to a point near their fusion point which would cause them to bond together into a solid mass, thereby losing their beneficial glass fiber properties. What makes this more difficult to avoid is that the burning out is an exothermic reaction which itself contributes additional heat, elevating the fiber temperature above that which is intended.

A number of patents disclose methods of removing the binder from the glass fibers. Exemplary of the techniques used to date are the following U.S. Patents: U.S. Pat. No. 2,674,549 issued to Balz; U.S. Pat. No. 3,253,897 issued to Falls; U.S. Pat. No. 3,375,155 issued to Adams; U.S. Pat. No. 3,847,664 issued to Gravel; U.S. Pat. No. 3,852,108 issued to Lindberg; and, U.S. Pat. No. 4,145,202 issued to Grodin et al.

None of these patents teach or suggest a method which is appropriate for recapturing fibers from non-woven glass mats quickly and economically. For example, Adams and Balz use chemical oxidizing agents in removing organic binder from the glass fibers. These agents must subsequently be removed by processes which are both costly and time consuming. In the procedures disclosed by Falls and Lindberg, the mat is unsupported during the burnout procedure. While woven fiber mats may have sufficient integrity even without the binder to enable such unsupported handling, non-woven mats do not. Once the binder is removed, a non-woven mat can easily lose its integrity and become a mass of disassociated fibers. Lastly, the processes of Gravel and Grodin et al. partially or totally destroy the fibers by utilizing a pulverization step in their methods prior to burning-out the binder. A substantial percentage of the fibers will be reduced to glass duct. The fibers which are recaptured will be shorter by a significant amount than the virgin fibers to which they will be added, with a corresponding difference in characteristics.

The present invention overcomes these deficiencies of the prior art. More specifically, the present invention discloses a method and apparatus to enable inorganic fibers to be recaptured from scrap mat for recycling by burning off the binder. Further, this method and apparatus enable this burnout procedure to be accomplished in a few seconds rather than in a period of time measured in minutes, as is the case with the prior methods.

In accordance with the instant method, a continuous strip of inorganic fibers such as a waste or scrap mat of non-woven glass fibers is supported and transported through a heating zone where an organic treating material or a compound (which may be, e.g., organic binders, lubricants, resins, etc.) dispersed in the mat, is removed. The mat is supported along a predetermined path in the heating zone so that when the organic treating compound is removed, recyclable or reclaimable fibers may be conveyed in a controlled manner out of the heating zone. The organic treating compound is removed by generating an oxygen-rich heating fluid, conducting the heating fluid to the heating zone and rapidly drawing the heating fluid through the mat at such a mass flow rate (velocity) that excessive temperature build-up is prevented, thus keeping the temperature around the fibers below their incipient fusion point. The heating fluid being drawn through the mat causes the organic treating compound to decompose and removes the products of decomposition or waste gases from the mat, leaving the fibers to be reclaimed or recycled. The clean reclaimable fibers are supported and conveyed from the heating zone. Upon leaving the heating zone the fibers are further conveyed by gravity or by a blast of air or a liquid and thereafter conveyed to either a hydropulper containing virgin fibers or, alternatively, to a dump if the fibers do not meet predetermined standards. Preferably, the incinerated waste gases are combined with the heating fluid being generated to compensate for energy losses. Advantageously, a plurality of layers of mat, e.g., up to five layers of mat may be processed utilizing the present method because the velocity of the heating fluid is kept sufficiently high to prevent heat build-up within the layers, thereby keeping the temperature below the fusion temperature of the glass composition of the fibers in the mat.

The apparatus of the present invention includes means for conveying a continuous strip of inorganic fibers such as scrap or waste fiber glass mat through an enclosed heating zone. A highly porous, rotatable suction drum, operating at a pressure below atmospheric, supports the scrap mat along a predetermined path as it is being conveyed through the heating zone. An oxygen-rich heating fluid, generated in a combustion chamber located distant from the heating zone, is conducted to the heating zone, directed to flow around the rotatable drum and drawn through the foraminous drum and the mat carried thereby, by means of a recirculating fan. The temperature of the heating fluid is maintained at a level high enough to ensure decomposition of the organic treating fluid in the mat while the process temperatures, heating fluid velocity, and speed of rotation of the drum are maintained at levels sufficient to ensure that the fusion or sintering temperature of the glass composition constituting the glass fibers is not reached. The rapidly moving heating fluid not only decomposes the organic treating compound, but also removes the products of decomposition, or waste gases, from the surface of the fibers to be recycled, at a rate sufficient to remove the heat of reaction and prevent excessive temperature build-up, thereby ensuring that the temperature of the reclamation fibers will not reach the fusion temperature of the glass composition. These waste gases may be recycled to the combustion chamber and combined with the heating fluid being generated. Under normal circumstances, the reclaimable or recyclable fibers are dumped via some means into a hydropulper or, if unacceptable quantities of organic treating fluid remain following burnout, the nonreclaimable fibers may be transported into a dump or a scrap bin.

The reclaimed fibers are not significantly damaged by the instant method and apparatus and may be readily dispersed with virgin or new fibers to make an acceptable fiber glass non-woven mat, by a conventional wet-mat process, for example. Alternatively, the reclaimed fibers may be conveyed in mat form from the burnout unit to a binder application and curing unit for binder reapplication.

DETAILED DESCRIPTION OF INVENTION

While the present invention is most particularly directed to the reclamation of glass fibers from a non-woven fiber glass mat wherein a suitable organic binder substance is provided to assist in holding the fibers together, the present invention is equally applicable to the reclamation of other inorganic fibers (such as refractory or asbestos fibers) which are maintained in a continuous strip (i.e., woven or non-woven) by a suitable organic treating compound or agent. For purposes of discussion, the present method and apparatus contemplates using a fibrous glass mat constructed in accordance with the disclosure of U.S. Pat. No. 4,112,174 issued Sept. 5, 1978 to Hannes et al which is hereby incorporated by reference. In that patent, a fibrous glass mat is comprised of a web of monofilament glass fibers (base fibers) and elongated glass fiber bundles (reinforcement bundles), the glass fibers and fiber bundles being dispersed throughout the web in a randomly oriented pattern. In addition, a suitable binder substance is provided to assist in holding the base fibers and reinforcement bundles together. The glass fiber bundles, a majority of which have their opposite ends terminating well within the confines of the web, provide tear resistance to the mat, especially where the latter is used as part of an asphalt shingle. The fibers recaptured by means of the present invention may, for example, be fed directly into such a hydropulper with virgin glass to form a mat using the patented process. It will be understood that the present invention may be used equally well in applications where no reinforcement bundles are utilized.

Figure 1:
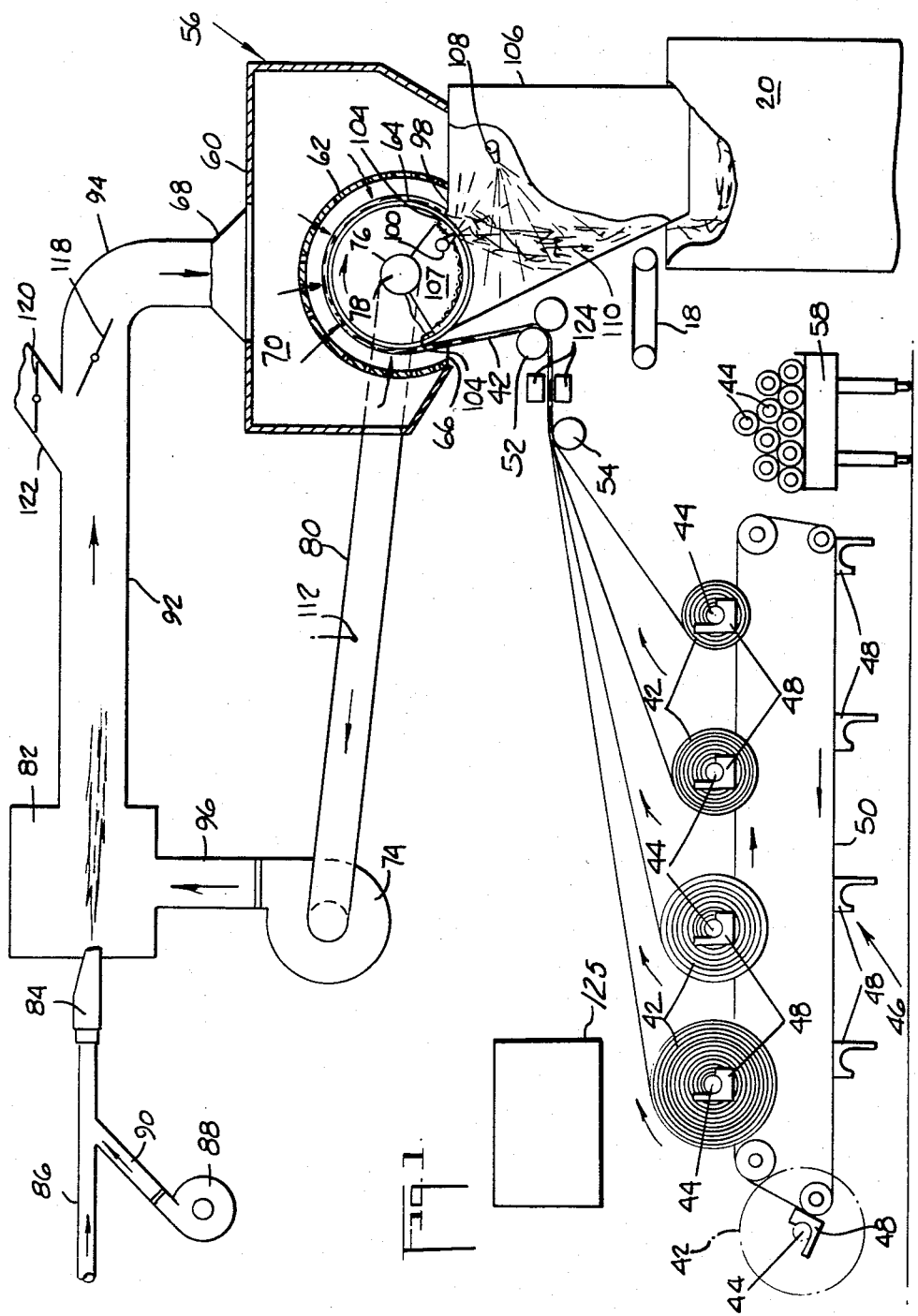
FIG. 1 is a schematic illustration of one form of the apparatus of the present invention.

As shown in FIG. 1, rolls of scrap mat 42 placed upon freely turning mandrels 44, are rotatably disposed upon a payoff stand or unit 46. The payoff stand 46 is suitably supported by means of a structure (not shown) and comprises a plurality of mandrel supporting brackets 48 affixed at regular intervals to a continuous conveyor 50. Each brackets 48 may be provided with conventional rotational support means such as a plurality of cam rollers, for example.

A pair of pull rolls 52 and an idler roller 54 draw upon the ends of the rolls 42 thereby causing the free turning mandrels 44 to rotate in brackets 48 and allow the material on the mandrels to be unwound. The material is thereafter conveyed to a heating zone in a unit 56. A semi-automatic advance of the mandrels 44 (by a means not shown) to new positions along the continuous conveyor 50 guarantees that a continuous supply of scrap rolls 42 is provided to the unit 56. FIG. 1 illustrates four rolls but it is contemplated that as many as five rolls and, thus, five layers of mat 42, may be processed at any one time through the unit 56. Of course, the number of layers would be dependent to a certain degree upon the thickness of the individual layers. Contemplated for use in this invention are mats whose normal thicknesses are in the range of about 3-100 mils. When a roll of scrap mat 42 has finally paid out, the conveyor 50 is indexed and the mandrel 44 remaining is dropped onto a mandrel carrying system 58 illustrated in FIG. 1 as a carrying cart. Of course, a more elaborate and sophisticated system for carrying mandrels away from the present apparatus may be readily designed by the skilled artisan.

The heating unit 56 comprises a double walled enclosing hood 60, a perforated plate 62 and a highly open, perforated rotatable drum 64 which may be driven by a conventional motor. The enclosing hood 60 is provided with a mat introduction slot 66 and a heating fluid intake port 68 which may be insulated to reduce energy losses. The perforated plate 62 which insures an even distribution of the heating fluid over a substantial portion of the rotatable drum 64, is disposed in a plenum chamber 70 defined by the enclosing hood 60.

The rotatable drum 64, which preferably should have about an 85% open area defined by a plurality of perforations (not shown for the sake of simplicity), supports the mat(s) 42 along a predetermined path as the organic treating compound or the binder substance in the mat is being removed. The perforated rotatable drum 64 is of open honeycomb or equivalent construction through which air at a temperature dependent on the incipient fusion or sintering temperature of the glass composition of the mat fibers is drawn by means of an air circulating fan 74 that is capable of sustaining high temperatures and producing high flow rates. A suitable rotary drum modifiable to be useful in the present invention is sold by the Honeycomb Systems Inc., Biddeford, Maine. Drum 64 may be any appropriate size. For example, the drum may be three feet in diameter and have a useful length of 52 inches. The rotatable drum 64 is suitably supported within the enclosing hood 60 by means of a support tube 76 upon which it is rotatably supported by means of commercially available high temperature outboard bearings or the like. The support tube 76 is provided with a sufficient number of openings so that a heating fluid may be drawn through the perforated drum 64 by the air circulating fan 74 via an exhaust port 78 and an insulated exhaust conduit 80.

The heating fluid, which is preferably hot air, may be generated in a distinct combustion zone or a chamber 82 utilizing an air heater 84. The air heater 84 may be an electric heater or a direct fired fuel/air heater which burns any clean burning fuel such as natural gas, propane or any equivalent fuel supplied by means of a pipe 86. The heater 84 utilizes combustion air supplied by a blower 88 via an air supply tube 90 and is controlled by a means (not shown) to maintain the temperature of the heating fluid generated in the combustion chamber 82 at a temperature which is less than the sintering or fusion temperature of the composition of the glass fibers. It is important to note that sufficient oxygen should be present in the heating fluid to ensure that substantially all of the organic treating fluid is removed from the glass fibers. The oxygen is, of course, supplied by means of the air supply tube 90.

The heating fluid generated in the chamber 82 is conducted by a plurality of insulated heating fluid conduits 92, 94 to the intake port 68 of the enclosing hood 60. The heating fluid enters the plenum chamber 70 via the port 68 and is evenly distributed over a substantial portion of the surface of the rotatable drum 64 by the perforated plate 62. The heating fluid is preferably distributed by the perforated plate 62 over approximately the upper 240° of the rotatable drum 64.

In use, the drum 64 is rotated and the heating fluid is drawn through the mat layer(s) 42 by means of the fan 74 as the mat is being conveyed through the unit 56 by the rotating drum 64. The high flow rate of the heating fluid causes a rapid decomposition of the organic treating fluid or binder substance as it is being drawn through the mat(s) 42. Controlling the flow rate of the heating fluid also ensures that rapid heat transfer takes place throughout the mat and prevents the process temperature from reaching the incipient fusion or sintering temperature of the glass composition of the glass fibers by drawing off the byproducts of decomposition (the exhaust gases) and the heat accompanying them, through support tube 76. This flow rate may be controlled using a variable speed fan 74, for example, or using dampers 118, 120, as described hereafter. From the support tube 76, the exhaust gases are directed through the exhaust conduit 80 to the combustion chamber 82 via a conduit 96. Any residual organic volatiles that are not yet decomposed in the unit 56 are recirculated to the chamber 82 to completely decompose or incinerate these gases to environmentally acceptable levels.

After the binding agent in the mat is decomposed by the rapidly moving heating fluid, substantially clean fibers, which may be reclaimed and recycled, are left on the rotating drum 64. The enclosing hood 60 is provided with an exit port 98 so that the reclaimable fibers which are deposited on the drum 64 may fall directly into a hydropulper tank 20, either by gravity or by means of a gaseous blast of air or other fluid discharged from a blow-off pipe 100.

If it is necessary to use a blow-off pipe 100 to discharge the reclaimed fibers, it may be disposed in a sealed compartment 107. Compartment 107 should be isolated from the remainder of the interior of the drum 64 by means of a plurality of seals 104. It is important to note that air flow through the drum 64 holds the reclaimable material on the drum until it reaches the compartment 107.

Substantially clean reclaimable fibers, denoted by the numeral 110, may normally be directed to the hydropulper tank 20 by means of an exit conveyor chute 106 which may be disposed below or downstream of the heating unit 56. A shower bar 108 optionally disperses an overspray within the reclaimed fibers 110 as they fall through the conveyor chute 106 to the hydropulper tank 20. The shower bar 108 may utilize the water used in the hydropulper or other conventional treatment fluids to suppress dust and lubricate the fibers 110.

Optionally, an oxygen/combustibles level sensor 112 may be located within the conduit 80 to measure the combustibles level of the exhaust gases being drawn from the unit 56. The volume of combustible gas generated from the decomposition of the binder per cubic foot of mat will be a known quantity. If the measured oxygen/combustible level is unacceptably low, it is an indication that insufficient binder has been removed from the fibers constituting the mat(s) 42. It is considered important to have oxygen present in the exhaust gases to insure that a satisfactory burn-out of treating compound has taken place. If excessive combustibles remain in the mat, an incomplete burnout condition has occurred and non-reclaimable fibers produced. Therefore, it is desirable to provide a means for deflecting the reclaimed fibers 110 which are non-reclaimable from the normal path when insufficient treating compound has been removed from the fibers. A suitable deflecting mechanism may be a pneumatically controlled deflector plate which may be controlled by a signal from the sensor 112 when the combustibles level is unacceptable so that the entire flow of insufficiently cleaned fibers 110 may be deflected to an appropriate dump.

Figure 2:
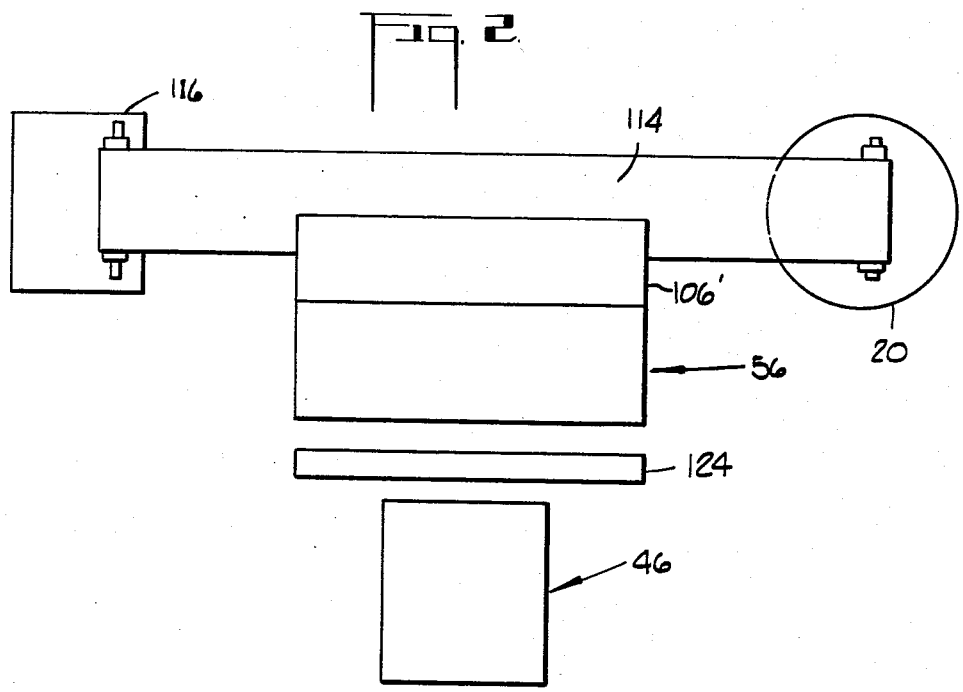
FIG. 2 illustrates an alternate embodiment of a portion of the apparatus of the present invention.

Alternatively, and more preferably the fibers 110 may be conveyed directly by a conveyor chute 106' to a reversible conveyor 114 (see FIG. 2). The conveyor 114 may be controlled by a signal from the sensor 112 or by a signal from an operator to either convey the fibers 110 to the hydropulper 20 if reclaimable or, to a scrap or dump container 116 if non-reclaimable.

A high temperature fluid damper 118 disposed in the conduits 92, 94 controls the pressure of the heating fluid within the plenum chamber 70. A high temperature fluid damper 120 may be disposed in a conduit 122 which adjoins the conduit 92 and provides a means to dump exhaust air out of the system. The exhaust dump conduit 122 allows the exhausting of approximately 25% of the fluid flow to the heating unit 56 and compensates for combustion makeup air from the blower 88 and leakage into the system. Without this feature pressures might be experienced within the heating unit 56 with potential for causing undesirable effects, including damage to the system.

Suitable controls, such as a conventional solid-state microprocessor 125 may be used to control the rotational speed of the drum 64, the air flow through the heating zone 56 via the dampers 118, 120 and the temperature in the heating zone to ensure that the fusion temperature of the fibers for a particular glass composition is never reached. The heating zone temperatures may be further controlled by means of a control on the temperature of the heating fluid generated in the chamber 82 in conjunction with a basis weight, density or mass flow sensor 124 which can maintain a substantially constant feed rate of cleaned fiber to the hydropulper 20 regardless of how many, what widths or square weights of scrap mat rolls are being reclaimed.

Figure 3:
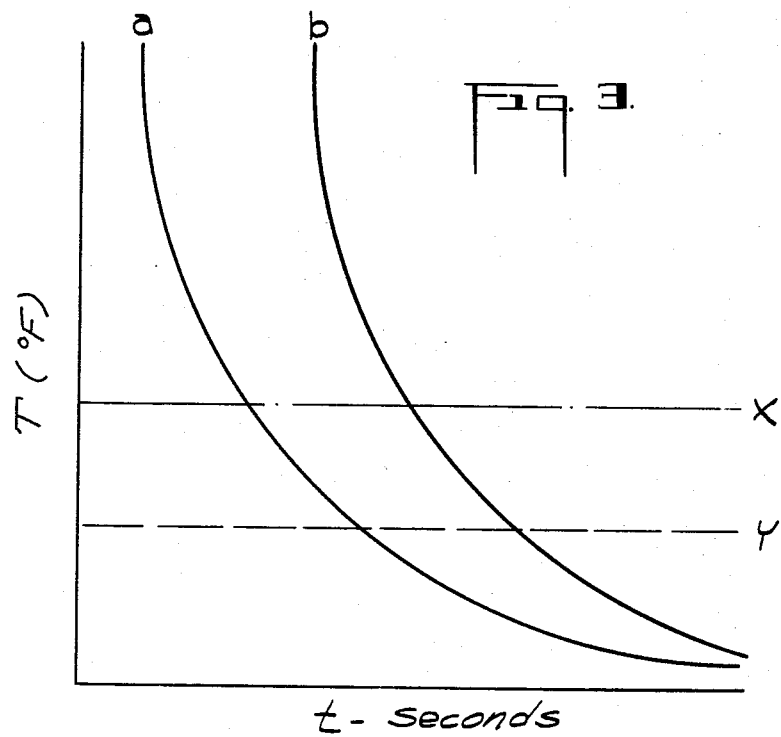
FIG. 3 depicts a generalized control method of the apparatus of the present invention.

The microprocessor should be capable of controlling the apparatus to ensure proper treatment of the scrap mat(s) 42 according to the general control scheme illustrated in FIG. 3. FIG. 3 qualitatively depicts some of the control parameters of the present invention needed to control the process and apparatus of the present invention. As can be seen, for a given temperature "x", the amount of treating compound within a given quantity of mat moving through the unit 56 at a given line speed can be burned-out or removed more quickly (i.e., shorter dwell time "t") at an air flow "a" than at an air flow "b", where "a" is greater than "b". For a given temperature "y" air flow "a" also reduces dwell time "t" in the burnout unit 56 as compared to air flow "b". The various parameters, i.e. air flows, line speed (dwell time "t"), temperatures, are naturally dependent on the glass composition chosen and quantity of material to be reclaimed.

As an example of appropriate operating parameters, the following values are given for a trial run in which four layers of mat containing a mixture of E glass and soft glass was processed.

$Tc = 1146°$ F.
$Td = 1120°$ F.
$Te = 929°$ F.
$Mc = 92.39$ lbs/min
$Md = 22.4$ lbs/min
$Me = 114.8$ lbs/min
$t = 30$ sec where
$Tc =$ temp. in plenum chamber 70
$Td =$ temp. of dump exiting through conduit 122
$Te =$ temp. of exhaust drawn through tube 76
$Mc =$ mass flow rate through chamber 70
$Md =$ mass flow rate through dump conduit 122
$Me =$ mass flow rate of exhaust through tube 76
$t =$ dwell time in burnout unit These values are merely exemplary of temperatures and mass flow rates useful in obtaining a successful burnout. The actual temperature seen by the mat is nearer to the exhaust temperature than it is to the temperature in the combustion chamber and, in all probability, is within 75° of the exhaust temperature. The upper limit on the temperature seen by the mat is 1150° F. for mat containing soft glass and 1350° F. for mat containing E glass. The temperature in the combustion chamber and mass flow rate of the exhaust must be maintained at maximum and minimum levels, respectively, in order to avoid reaching these critical levels. The dump temperature is measured near the top of conduit 122 just prior to entering the atmosphere and is for that reason lower than the temperature in chamber 70.

These data indicate a mass flow rate through the exhaust which exceeds that in the plenum chamber 70, even though 20-25% of the heating fluid is removed through dump conduit 122. This is a result of air intentionally leaked into the system, primarily in the vicinity of the exhaust, in order to avoid the potential problems associated with a completely closed, pressurized system, as discussed previously. The dwell time in the burnout unit of 30 seconds provides a linear mat speed of about 20 feet per minute per roll or, a capability of processing 100 feet of 52 inch width mat per minute.

As many apparently widely different embodiments of the present invention may be made without departing from the spirit and scope thereof, it is to be understood that the invention is not limited to the specific embodiments. For example, while it has been indicated that the reclaimed fibers can be recombined with virgin fibers to form a new mat, it will be apparent that the fibers, which are generally in the form of a mat when they exit the burnout unit, could be conveyed through a binder application and curing unit. Further, the mat(s) may be passed within a heating zone supported by a stationary flat perforated bed instead of being supported on a rotatable drum as described above. The stationary bed would be especially useful for experimental work on sample pieces. Accordingly, it is intended that all such changes, modifications or alternatives as come within the scope of the appended claims be considered part of the present invention.

We claim:

1. Apparatus for reclaiming inorganic fibers disposed in a continuous strip of non-woven fibers containing a binding agent by removing said agent, said apparatus comprising:
 a heating zone;
 means for moving said strip through said heating zone;
 means for supporting said strip along a predetermined path as said strip is being moved through said heating zone, said strip being fully supported in said zone both before and after said binding agent is removed;
 means for generating a heating fluid;
 means for conducting said heating fluid to said heating zone;
 means for drawing said heating fluid through said strip to decompose said binding agent and remove said binding agent from the strip; and
 means for controlling
  (a) the rate of movement of said strip through said heating zone,
  (b) the mass flow rate of said heating fluid through the strip, and
  (c) the temperature of said heating fluid, to ensure that said inorganic fibers are not exposed to temperatures sufficient to cause said fibers to fuse; whereby reclaimed inorganic fibers are obtained.

2. Apparatus as in claim 1, wherein said moving means comprises a plurality of pull rolls.

3. Apparatus as in claim 1, wherein said suporting means comprises a rotatable drum.

4. Apparatus as in claim 3, wherein said drum is provided with a plurality of perforations.

5. Apparatus as in claim 4, wherein said perforations constitute about 85% of the working surface of said drum.

6. Apparatus as in claim 1, further comprising means for conveying said reclaimed fibers from said heating zone.

* * * * *